Dec. 4, 1951     F. WOOD, JR     2,577,293
MULTIPLE SPOUT CONTAINER

Filed Oct. 18, 1949     2 SHEETS—SHEET 1

INVENTOR.
FRANK WOOD, JR.

ATTORNEYS

Dec. 4, 1951 F. WOOD, JR 2,577,293
MULTIPLE SPOUT CONTAINER
Filed Oct. 18, 1949 2 SHEETS—SHEET 2
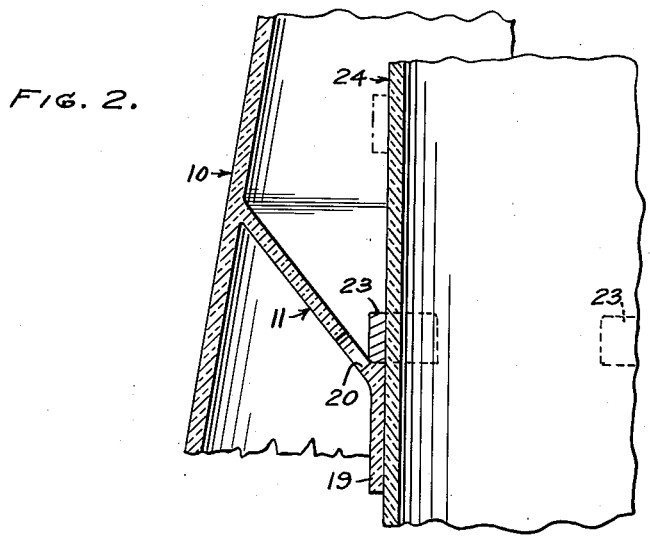
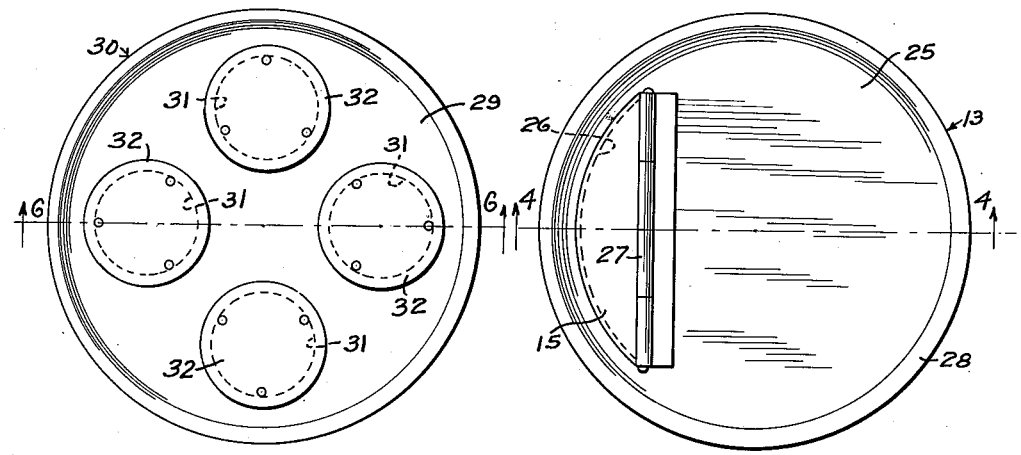
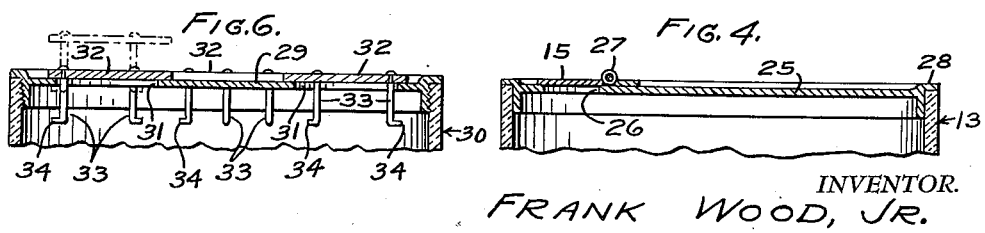
INVENTOR.
FRANK WOOD, JR.
BY *Victor J. Evans & Co.*
ATTORNEYS Patented Dec. 4, 1951

2,577,293

UNITED STATES PATENT OFFICE 2,577,293

MULTIPLE SPOUT CONTAINER

Frank Wood, Jr., Fort Worth, Tex.

Application October 18, 1949, Serial No. 121,978

3 Claims. (Cl. 65—13)

1

This invention relates to drinking glasses for family use, and in particular includes a glass having a plurality of spouts formed in an outer shell with an inner refillable supply container freely positioned in the shell and adapted to supply fluid to the spouts.

The purpose of this invention is to provide a family drinking utensil or glass with an individual spout provided for different members of the family so that it is not necessary to use a new glass each time a member of the family desires a drink of water or the like.

Particularly in warm weather a bottle of ice water is provided in the usual refrigerator and each member of the family takes a glass from the cabinet and pours water, milk or fruit juice from the bottle or container. This necessitates soiling a glass each time a drink of water or the like is required. With this thought in mind this invention contemplates a supply container having an outer shell with a plurality of drinking spouts formed in the upper end wherein as the container is tilted fluid is supplied to the spout on the low side and after drinking from the spout the excess material flows downwardly into an area in the lower end of the outer jacket. By this means the spouts may be marked or indicated so that each member of the family uses the same spout each time a drink is desired.

The object of this invention is, therefore, to provide a combination family drinking glass or container which is so constructed that a plurality of people may drink from spouts of the container without danger of germs spreading from one spout to another or excess fluid passing back into a supply container.

Another object of the invention is to provide a combination drinking glass for family use having a supply container therein in which the supply container may readily be removed, cleaned, and refilled.

A further object of the invention is to provide a combination drinking glass having a supply container therein which is of a simple and economical construction.

With these and other objects and advantages in view the invention embodies an outer shell having an outwardly flared lower end with a constricted portion spaced from the upper end and having a plurality of drinking spouts formed in the upper end, and an inner supply container positioned to supply water or the like to the different spouts as the container is tilted for drinking.

Other features and advantages of the inven-

2 tion will appear from the following description taken in connection with the drawings wherein:

Figure 2 is a detail showing a cross section taken on line 2—2 of Figure 1 showing an annular conical shaped baffle in the lower part of the shell and positioned to receive the lower part of the supply container.

Figure 3 is a plan view showing the upper end of the supply container.

Figure 4 is a cross section through the upper end of the supply container taken on line 4—4 of Figure 3.

Figure 5 is a view showing the upper end of a supply container showing a modification wherein a plurality of closure caps are slidably mounted in openings in the upper end of the container.

Figure 6 is a cross section taken on line 6—6 of Figure 5 showing the slidably mounted closure caps.

Figure 1:
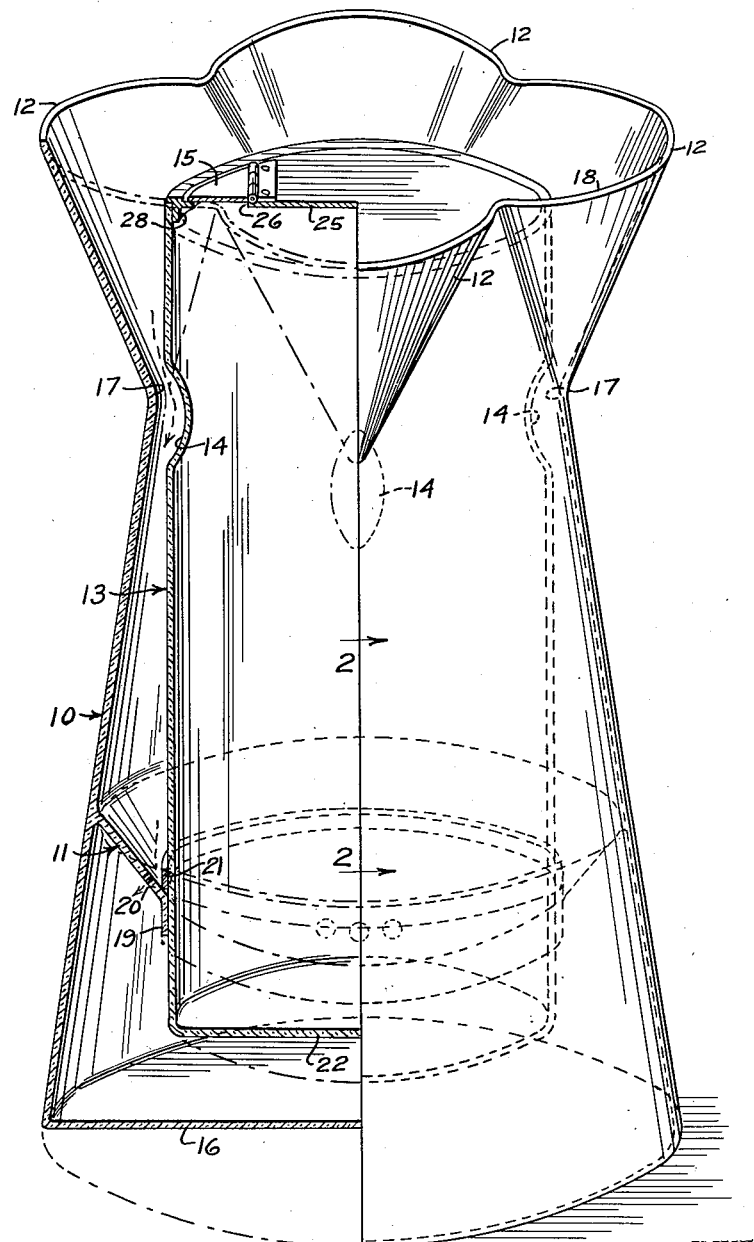
Figure 1 is an elevational view with parts broken away and shown in section illustrating the general construction and arrangement of the multiple spout container and showing an inner supply container with a hinged flap on the upper end.

Referring now to the drawings wherein like reference characters denote corresponding parts the multiple spout container or family drinking glass of this invention includes an outer conical shaped shell 10 having a conical shaped baffle 11 in the lower part thereof and spouts 12 in the upper end, and an inner supply container 13 having spaced indentations 14 in the outer surface and a hinged lid 15 on the upper end.

The shell 10 is formed with a base 16 and the wall of the shell tapers inwardly to a throat 17 and the spouts 12 are formed in the upper rim 18 with the lower ends of the spouts terminating at the throat 17.

By this means the upper end of the shell 10 is divided into a plurality of individual drinking spouts and each spout may be used by a different person.

The baffle 11 extends inwardly from the shell 10 and a vertically disposed ring or flange 19 is provided around the lower end to receive the supply container 13, as shown in Figure 1. The baffle 11 is provided with perforations 20 which are positioned in the inner edge, adjacent the flange 19 and drip from the spouts passes downwardly through these perforations into the lower end of the shell, however, as the glass or container is tilted to drink from a spout the small amount of liquid in the lower end of the shell is caught by the baffle 11 so that it does not flow upwardly along the inner surface of the wall of the shell to another spout.

The supply container 13 is provided with a ring 21 that rests upon the inner edge or flange 19 of the baffle 11 to support the supply container with the lower end 22 spaced above the base 16 of the shell.

As illustrated in Figure 2 the ring 21 may be replaced by a plurality of lugs 23 that are positioned on the outer surface of a supply container 24 similar to the container 13. The design and construction of the shell 10 and baffle 11 remains the same as illustrated in Figure 1 and the same reference numerals are used in the section shown in Figure 2. It will be understood that any suitable means may be used on the supply container to support the container from the baffle or in spaced relation to the lower end of the shell.

The indentations 14 in the wall of the supply container 13 are positioned to register with the throat 17 whereby, as illustrated in Figure 1 seepage or drip from the spouts 12 may pass downwardly through the throat to the area below.

In the design illustrated in Figures 1, 3 and 4 the upper end 25 of the supply container is provided with an opening 26 and with the lid 15 connected to the end 25 by a hinge 27 the lid will drop downwardly by gravity to cover the opening 26 when the device is in a vertical position. An annular angle 28 may be provided around the inner end of the supply container, as shown in Figure 1 to provide a rest for the lid 15.

In the design illustrated in Figures 5 and 6 an upper end 29 of a supply container 30 is provided with a plurality of openings 31 and closure caps 32 with extended legs are freely positioned in the openings 31 whereby as the container is tilted the caps 32 slide away from the opening as indicated by the dotted lines in Figure 6 to permit liquid in the supply container flowing through an opening into a spout. The legs 33 are provided with projections 34 on the lower ends to limit outward movement of the caps 32. It will be understood that any suitable means may be provided for closing the upper end of the supply container or for closing openings therein.

The spouts at the upper end of the shell, which represent glasses may be formed of different colors or any suitable indicating means may be provided thereon and the complete container, as illustrated in Figure 1, may be placed in a refrigerator or the like. When it is desired to drink from the container it is removed from the refrigerator as a unit and as the container is tilted to drink from a spout water or other liquid in the container flows from the supply container into the spout. After drinking the container is set upright whereby excess material flows or drips downwardly into the open area in the lower part of the shell passing to the openings in the baffle 11. By this means excess fluid does not pass from one spout to the other.

The inner supply container may readily be removed so that the entire device may be cleaned or sterilized and the inner container may be refilled.

It will be understood that other modifications may be made in the design and arrangement of the parts without departing from the spirit of the invention.

What is claimed is:

1. In a multiple spout drinking container, the combination which comprises an outer shell having a frusto-conical shaped lower end with a plurality of spaced drinking spouts positioned around the upper end, said shell having a downwardly and inwardly sloping baffle positioned around the inner surface of the wall thereof and spaced from the lower end, said baffle having perforations in the inner end thereof, and an inner supply container having a closed lower end and an opening in the upper end positioned in the shell and carried by the baffle said baffle having a flange coacting with the outer surface of the inner supply container whereby drip is retained in the lower end of the said outer shell.

2. In a multiple spout drinking container, the combination which comprises an outer shell having a frusto-conical shaped lower end with a plurality of spaced drinking spouts positioned around the upper end, said shell having a downwardly and inwardly sloping baffle positioned around the inner surface of the wall thereof and spaced from the lower end, said baffle having perforations in the inner end thereof, an inner supply container having a closed lower end and an opening in the upper end positioned in the shell and carried by the baffle said baffle having a flange coacting with the outer surface of the inner supply container whereby drip is retained in the lower end of the said outer shell, and closure means in the upper end of the supply container.

3. In a multiple spout drinking container, the combination which comprises an outer shell having a frusto-conical shaped lower end with a plurality of spaced drinking spouts positioned around the upper end, said shell having a downwardly and inwardly sloping baffle positioned around the inner surface of the wall thereof and spaced from the lower end, said baffle having perforations in the inner end thereof, an inner supply container having an opening in the upper end positioned in the shell and carried by the baffle, and closure means in the upper end of the supply container, said supply container having indentations in the wall thereof positioned to register with the lower ends of the spout.

FRANK WOOD, JR.

REFERENCES CITED

The following references are of record in the file of this patent:

UNITED STATES PATENTS

| Number | Name | Date |
| --- | --- | --- |
| 574,615 | Law | Jan. 5, 1897 |
| 685,784 | Moller | Nov. 5, 1901 |
| 781,220 | Moller | Jan. 31, 1905 |
| 803,416 | Harbour | Oct. 31, 1905 |
| 870,556 | Harbour | Nov. 12, 1907 |
| 908,706 | Sprinkle | Jan. 5, 1909 |